US008699326B2

(12) United States Patent
Nors

(10) Patent No.: US 8,699,326 B2
(45) Date of Patent: Apr. 15, 2014

(54) OPTICAL NETWORK AUTOMATIC PROTECTION SWITCHING

(75) Inventor: Niclas Nors, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 506 days.

(21) Appl. No.: 13/017,964

(22) Filed: Jan. 31, 2011

(65) Prior Publication Data

US 2012/0195589 A1 Aug. 2, 2012

(51) Int. Cl.
*G01R 31/08* (2006.01)

(52) U.S. Cl.
USPC ............................................ 370/217; 370/225

(58) Field of Classification Search
None
See application file for complete search history.

(56) References Cited

U.S. PATENT DOCUMENTS

| | | | | |
|---|---|---|---|---|
| 2004/0202466 | A1* | 10/2004 | Koch et al. | 398/1 |
| 2005/0243837 | A1* | 11/2005 | Boyd et al. | 370/395.52 |
| 2007/0121638 | A1* | 5/2007 | Szczebak et al. | 370/394 |
| 2007/0214270 | A1* | 9/2007 | Absillis | 709/227 |
| 2008/0279549 | A1* | 11/2008 | Kazawa et al. | 398/17 |
| 2008/0298803 | A1* | 12/2008 | Warner et al. | 398/43 |
| 2009/0067835 | A1* | 3/2009 | Chen | 398/45 |
| 2009/0214221 | A1* | 8/2009 | Li et al. | 398/136 |
| 2010/0074096 | A1* | 3/2010 | Underwood et al. | 370/216 |
| 2010/0202612 | A1* | 8/2010 | Nema et al. | 380/256 |
| 2010/0247098 | A1* | 9/2010 | Nesset et al. | 398/58 |
| 2011/0317995 | A1* | 12/2011 | Zheng | 398/2 |

OTHER PUBLICATIONS

PCT Search Report, mailed May 23, 2012, in connection with International Application No. PCT/EP2012/050525.
PCT Written Opinion, mailed May 23, 2012, in connection with International Application No. PCT/EP2012/050525.
Hunter, D. K. et al. "Protection of long-reach PON traffic through router database synchronization", Journal of Optical Networking, XX, XX, vol. 6, No. 5, May 1, 2007, pp. 535-549, XP002594455, DOI: 10.1364/JON.6.000535.
Mukai, H. et al. "PON with Automatic Protection switching for high reliable communication", Optical Switching and Networking, Elsevier, NL, vol. 6, No. 3, Jul. 1, 2009, pp. 163-170, XP026348826, ISSN: 1573-4277.
Network Working Group, Request for Comments 926, "Protocol for Providing the Connectionless-Mode Network Services", Dec. 1984.

\* cited by examiner

*Primary Examiner* — Phirin Sam
(74) *Attorney, Agent, or Firm* — Potomac Patent Group PLLC

(57) ABSTRACT

There is described an optical terminal for use in a passive optical network. The optical terminal comprises an optical I/O module for sending and receiving optical data packets along an optical fiber, an electrical I/O module for sending and receiving electrical data packets via an electrical connection, a signal converter operatively connected to the optical and electrical I/O modules for converting the data packets between optical and electrical formats, a controller for controlling the operation of the I/O modules and the signal converter. The controller is configured to detect a failure of a primary data path in the optical network, initiate an automatic protection switch to a secondary data path for optical data packets, and generate traffic flow update messages to be sent upstream. Each traffic flow update message contains, as a source address, a MAC address of a client device downstream of the terminal.

18 Claims, 7 Drawing Sheets

US 8,699,326 B2

OPTICAL NETWORK AUTOMATIC PROTECTION SWITCHING

TECHNICAL FIELD

The invention relates to optical communication and, more particularly, to traffic flow updates during automatic protection switching in optical networks.

BACKGROUND

Broadband access is increasingly moving to fibre technology such as passive optical networks (PONs), for example GPONs (gigabit passive optical networks) or EPONs (Ethernet passive optical network). PONs can deliver voice, video and data services among multiple network nodes, often referred to as optical network terminals (ONTs) or optical network units (ONUs), using a shared optical fibre. Passive optical splitters and combiners enable multiple ONTs to share the same optical fibre link. For example, downstream information carried by the shared optical fibre link may be optically split for transmission to multiple ONTs via individual optical fibres. Likewise, upstream information received from individual ONTs via individual optical fibres may be optically combined for transmission via the shared optical fibre link. An ONT, sometimes referred to as a subscriber premises node, may be connected to one or more subscriber devices, such as televisions, set-top boxes, telephones, computers, or network appliances, which utilize voice, video and data services delivered via the PON.

A PON typically includes a PON interface, sometimes referred to as an optical line termination (OLT), which may have multiple PON interface modules. The PON interface modules serve respective optical fibre links. An OLT provides an interface for downstream transmission and upstream reception of information over a shared optical fibre link that serves a group of ONTs. The OLT may be coupled to an optical splitter/combiner via the shared optical fibre link. A PON is inherently a downstream-multicast medium. Each downstream communication on the shared optical fibre link can be received by every ONT served by that link. ONTs may identify selected packets or frames on the optical fibre link based on addressing information included within the packets or frames. In addition, individual ONTs transmit upstream packets to the OLT via the shared optical fibre link.

The addressing information may be identified using the Address Resolution Protocol (ARP), which is a networking protocol for determining a network node's Link Layer or hardware address when only its Internet Layer (IP) or Network Layer address is known. In the case of IPv4 Ethernet networks, ARP is used to translate IPv4 addresses (OSI Layer 3) into Ethernet Media Access Control (MAC) addresses. In the next generation Internet Protocol, IPv6, ARP's functionality is provided by the Neighbour Discovery Protocol (NDP). It will be appreciated that ARP is not specifically associated with PONs, but is often used in conjunction with PONs when the electrical side of an ONT or OLT is connected to an Ethernet network.

Schemes have been proposed for these technologies to carry out automatic protection switching to guard against failure of an optical fibre in an optical distribution network (ODN). Each ONT/ONU is connected to at least two optical fibres, which may be routed to the same OLT or different OLTs. A protection switch determines whether there is an optical fibre failure in a fibre link in the ODN upstream of an ONT and, if so, switches to a different link or ODN. Such schemes currently specify how the automatic protection switching itself is carried out, but do not make any provision as to how traffic flow through the network should be updated. In order for an approach that can operate in an Ethernet network built with multiple vendor's equipment, a method is needed that will work with most standard equipment.

An additional problem is that various protocols have been defined for a client device to send messages, but they are rarely reliable and differ a lot between client devices and their operative systems. For example, Gratuitous ARP messages are used when the client device's network interface is being connected. Gratuitous ARP messages from the client device cannot be used for the purpose of updating during a protection switch, since the link towards the client device is not affected, and therefore not noticed by the client devices. When protection switching takes place at an ONT, the northbound link is switched, but the southbound link towards the client device is maintained. This means that client devices will not notice the switch and will not send any messages.

The problems can be understood with reference to FIG. 1, which is a schematic illustration of a typical architecture of a network 100 for delivering data from an application server 101 to a client device 102. The application server 101 is connected via layer 2 (Ethernet) network switches 103, 104, 105 to two OLTs 106, 107. Each OLT 106, 107 is connected by an optical fibre 108, 109 to a splitter 110, 111 in a respective optical distribution network (ODN) 112, 113. An ONT/ONU 114 is connected by optical fibres 115, 116 to both splitters 110, 111. The ONT/ONU 114 is also connected to the client device 102. It will be appreciated that, normally, many ONT/ONUs will be connected to the ODNs 112, 113, and that each ONT/ONU may be connected to one or more than one client device. In this example a single ONT/ONU 114 and client device 102 is shown for clarity.

The ONT/ONU 114 is thus connected to two different ODNs 112, 113. Initially the ONT/ONU is only actively forwarding client device traffic through one of the OLTs 106 and a "primary" ODN 112.

If a fibre 108, 115 breaks, or for some reason the 106 OLT is not properly working, the ONT/ONU 114 is able to detect this. The ONT/ONU then decides to do a switch over to a secondary ODN 113 and start forwarding traffic through its corresponding OLT 107, as set out in the defined protection schemes.

The problem that arises when the automatic protection switching happens is that the switches 103, 104, 105 in the Ethernet Network (L2 Network) are unaware about this. Any traffic which is ongoing is still being forwarded through the ports of the switches 103, 104 where the MAC address of the client device 102 was first learned. It is possible to let the MAC address entries in the switches time out so they can be re-learned, but this is very time consuming. An alternative solution relies on the fact that the client device 102 may be sending traffic, and these packets would therefore update the learned entries in the Ethernet network 103, 104, 105. In traffic scenarios where traffic is uni-directional during a longer period this could become a issue, since the time elapsed before the client device sends any traffic could be significant. This could be seen in UDP traffic, where there is no acknowledgement of packets.

Both of the approaches described above are too slow and will in most cases cause traffic interruption and packet loss. With some applications and/or protocols they may also loss of connectivity because of the long switch over time and re-learning time.

SUMMARY

It is an object of the present invention to address, or at least alleviate, the problems described above.

The invention provides that the ONT or OLT, which acts on behalf of the clients, can ensure that a traffic flow update is carried out so that it is transparent to the client devices.

In accordance with one aspect of the present invention there is provided an optical terminal for use in a passive optical network. The optical terminal comprises an optical I/O module for sending and receiving optical data packets along an optical fibre, an electrical I/O module for sending and receiving electrical data packets via an electrical connection, a signal converter operatively connected to the optical and electrical I/O modules for converting the data packets between optical and electrical formats, a controller for controlling the operation of the I/O modules and the signal converter. The controller is configured to detect a failure of a primary data path in the optical network, initiate an automatic protection switch to a secondary data path for optical data packets, and generate traffic flow update messages to be sent upstream. Each traffic flow update message contains, as a source address, a MAC address of a client device downstream of the terminal.

The controller may be configured to inspect data packets processed by the signal converter and identify, from the inspected data packets, MAC addresses (and optionally also IP addresses) of client devices downstream of the terminal. These may be stored at the optical terminal. Each traffic control flow update message may also contains an IP address of the client device downstream of the terminal The optical terminal may be configured to operate when there is an Ethernet network upstream of the passive optical network so as to update switches in the Ethernet network.

In some embodiments the traffic flow update messages may be Gratuitous ARP messages, or alternatively NDP messages, although it will be appreciated that messages under other protocols which have the necessary effect may also be used.

The optical terminal may be an ONT or an OLT.

In accordance with another aspect of the present invention there is provided a network for delivering data from an application server to a client device. The network comprises an Ethernet network for receiving data packets from the application server, a passive optical network comprising a primary data path and a secondary data path for receiving the data packets from the Ethernet network, and a service network for receiving the data packets from the passive optical network and delivering them to the client device. The passive optical network includes the optical terminal described above.

In accordance with another aspect of the present invention there is provided a method of effecting an automatic protection switch in a passive optical network. The method comprises, at an optical terminal, detecting a failure of a primary data path for optical data packets in the network. The method further comprises initiating the automatic protection switch to a secondary data path for the optical data packets, generating traffic flow update messages, and sending the traffic flow update messages upstream from the optical terminal. A MAC address of a client device downstream of the optical terminal is inserted into each traffic flow update message as a source address.

The invention also provides a computer program, comprising computer readable code which, when run by an optical terminal, causes the optical to perform the method described above. The invention also provides a computer program product comprising a computer readable medium and a computer program as described above, wherein the computer program is stored on the computer readable medium.

Thus the invention, at least in preferred embodiments, uses a standard protocol which allows for interoperability with multiple network equipment vendors. It provides a simple but effective mechanism to handle automatic protection switching across multiple OLTs. It enables a fast mechanism for restoring traffic flows/paths after automatic protection switching. It does not require any intercommunication between the OLTs and other nodes to update the Ethernet network. It does not rely on the client device to implement specific functions to allow fast automatic protection switch over. It provides a solution that can use standard protocols and additional intelligence in the ONT/ONU to solve the update of the traffic flows in the Ethernet network.

BRIEF DESCRIPTION OF THE DRAWINGS

Some preferred embodiments of the invention will now be described by way of example only and with reference to the accompanying drawings, in which.

DETAILED DESCRIPTION

In this document the terms ONT and ONU are is used interchangeably to describe the same type of device. The word "operator" as used herein generally refers to a network and/or service operator. A client device is generally a device or equipment communicating with another device over an the network. An application server is any client or server that is the communication end-point with which a client device is communicating.

The description set out below addresses the traffic flow updates that must occur when automatic protection switching in an optical network takes place. There are two main methods, usually performed by an ONT/ONU, to achieve this. The ONT/ONU undertakes snooping of client traffic and/or IP address assignment to be aware about connected devices. The ONT/ONU also issues gratuitous ARP messages for updating the Ethernet network directly after an automatic protection switch.

A gratuitous ARP request is an ARP request packet where the source and destination IP are both set to the IP of the machine issuing the packet, and the destination MAC address is the broadcast address ff:ff:ff:ff:ff:ff. Ordinarily, no reply packet will be sent. A gratuitous ARP reply is a reply to a request which has not been made—i.e. it is a reply type message where no request has been made. This is sometimes used to detect duplicated IP Addresses in a network, but it is also a message that switches can use to learn and update their port MAC address tables.

In this document, the term gratuitous ARP is used to describe both a "traditional" gratuitous ARP message as well as any other messages that perform the same function. These could be other ARP messages with the purpose of updating the MAC tables in switches, as well as other non ARP messages which would achieve the same result in a switch. The term gratuitous ARP is thus used in this document to describe the process of sending a message to update the switches. In IPv4 ARP is used, but it will be appreciated that the invention may also apply to IPv6 networks. In IPv6 the Neighbour Discovery Protocol (NDP) is used instead of ARP, as this is the equivalent IPv6 protocol. If the IP address is known by the access node, a Duplicate Address Detection (DAD) message is the most suitable. If this is a node where the IP is unknown, such in a Layer 2, Bridged, network, a Router Solicitation message is more suitable, where the source address could be 0::0.

For clarity, the following examples have been described with reference to IPv4, but it will be appreciated that the same principles are applicable to IPv6 or other protocols, with the recommendations set out above.

Figure 1:
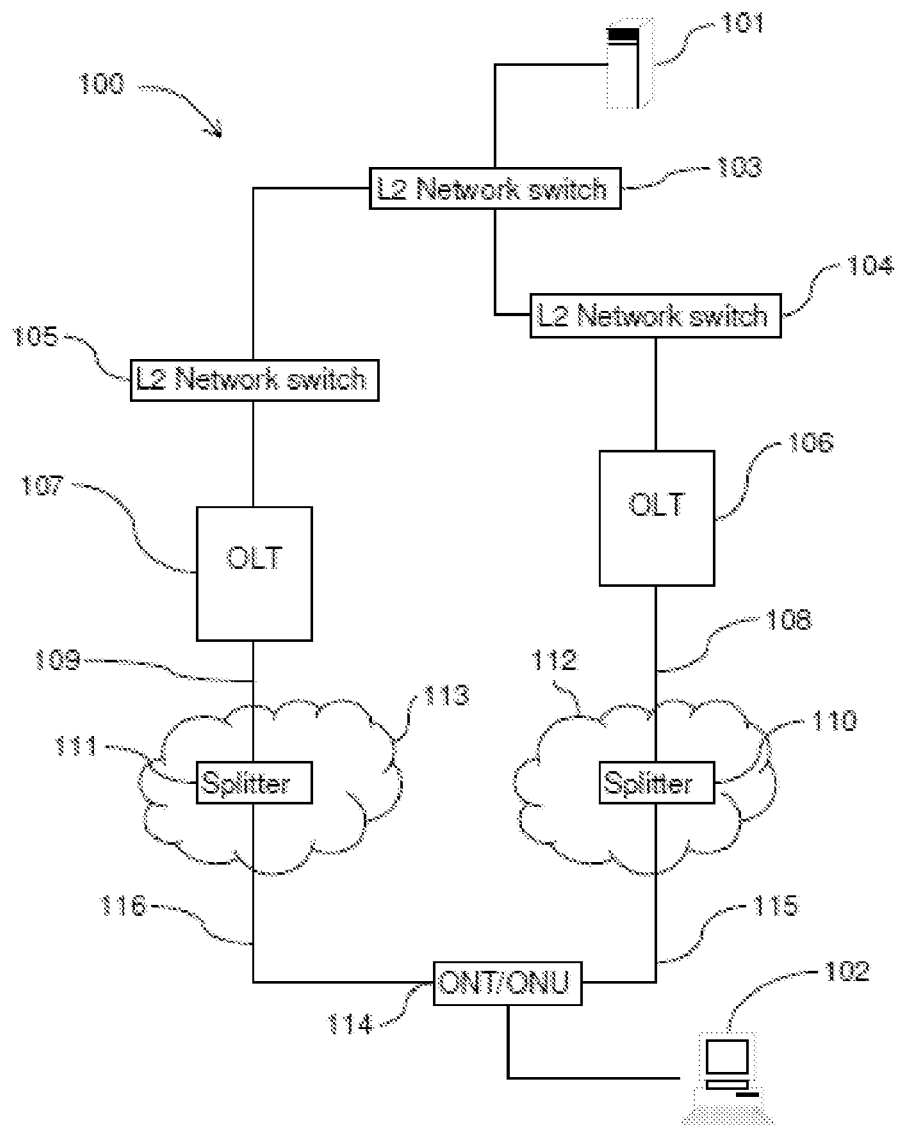
FIG. 1 is a schematic illustration of a typical architecture of a network, including a passive optical network, for delivering data from an application server to a client device.
Figure 2:
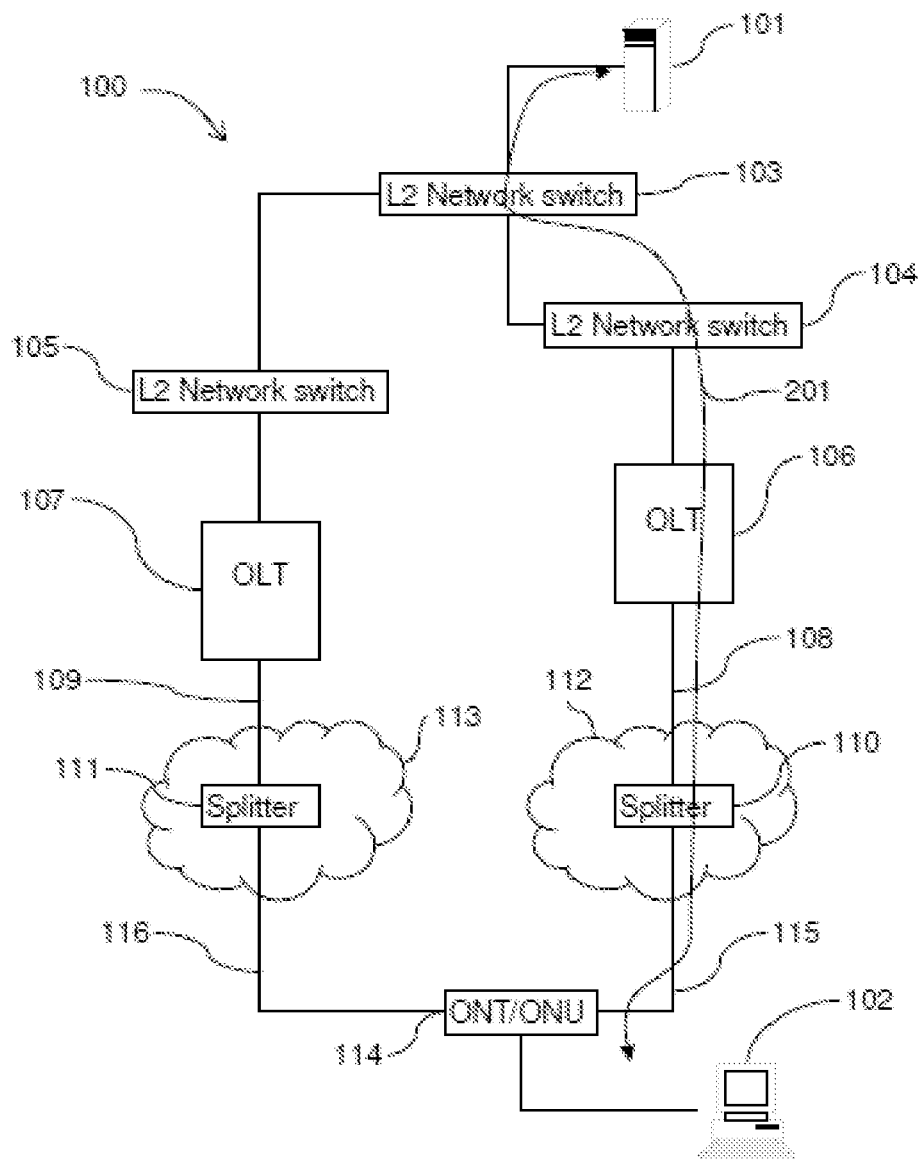
FIG. 2 is a schematic illustration of the network of FIG. 1, showing the communication between the client device and application server along a primary data path.

FIG. 2 is a schematic illustration of the network 100 of FIG. 1, showing the communication between a client device 102 and application server 101, using an established communication channel 201. This has been preceded by an IP address assignment of the client device, and learning by the OLT 106 and the Ethernet network of the proper traffic flow path. This learning process is standard and the procedures required are not discussed here.

During the initial IP address assignment of the client device, and establishment of communication, the ONT/ONU 114 learns the MAC address and IP Address of the connected client device 102 (and any other client devices not shown in FIG. 2) by snooping. This could be done in one of a number of ways, such as ARP snooping, Dynamic Host Configuration Protocol (DHCP) Snooping, etc. The mechanism used for learning is up to the implementation.

Figure 3:
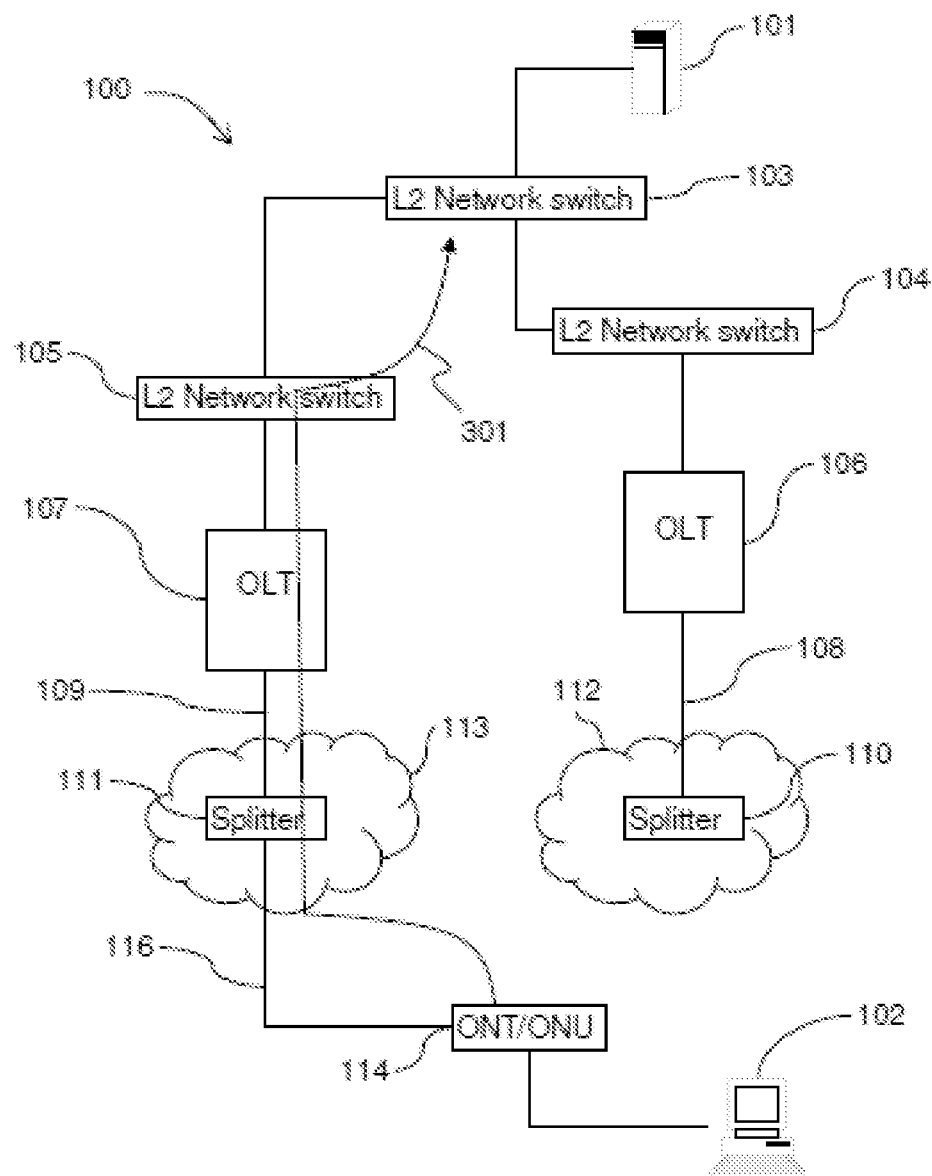
FIG. 3 is a schematic illustration of the network of FIG. 1 when the primary data path has been interrupted.

FIG. 3 is a schematic illustration of the same network 100 when the normal traffic path has been interrupted. In this example this is because of a break in the fibre 115, but it could also be because of failure in the OLT 106.

The GPON and EPON (and other PON) protocols include mechanisms for detecting link failure such as a broken fibre. When a failure occurs, the ONT/ONU 114 quickly becomes aware of this and initiates automatic protection switching to the secondary ODN 113. As soon as the switch over has been done, the ONT/ONU 114 sends out Gratuitous ARP messages 301 on behalf of the connected client device(s) 102 to notify any node between the ONT/ONU 114 and the Application server 101 that the MAC address of the client device 102 (and the MAC addresses of any other client devices attached to this ONT/ONU 114) has moved to another location. The switching takes place very quickly (typically over a period of tens of milliseconds) so it is important that the address updates can also happen quickly.

Since traffic could be either Layer 2 (MAC) or Layer 3 (IP), the following discussion will address both type of traffic, even though Layer 3 (IP) is the most common.

In a Layer 3, IP, scenario, the ONT/ONU 114 is aware of both the MAC and IP addresses of the client device 102, and can take advantage of this knowledge when generating a Gratuitous ARP message. A gratuitous ARP message normally contains the source MAC address of the client device 102 as well as the source IP address. The ONT/ONU 114 generates this message on behalf of the client device to ensure that MAC tables in the switches 103, 105 in the layer 2 Ethernet network are updated.

An example of a Gratuitous ARP message that might be sent by the ONT/ONU 114 is shown below:

```
Ethernet II, Src: 02:02:02:02:02:02, Dst: ff:ff:ff:ff:ff:ff
    Destination: ff:ff:ff:ff:ff:ff (Broadcast)
    Source: 02:02:02:02:02:02 (02:02:02:02:02:02)
    Type: ARP (0x0806)
    Trailer: 000000000000000000000000000000000000
Address Resolution Protocol (request/gratuitous ARP)
    Hardware type: Ethernet (0x0001)
    Protocol type: IP (0x0800)
    Hardware size: 6
    Protocol size: 4
    Opcode: request (0x0001)
    Sender MAC address: 02:02:02:02:02:02
(02:02:02:02:02:02)
    Sender IP address: 192.168.1.1 (192.168.1.1)
    Target MAC address: ff:ff:ff:ff:ff:ff (Broadcast)
    Target IP address: 192.168.1.1 (192.168.1.1)
```

In a scenario where traffic between the client device 102 and application server 101 relies on Layer 2 (MAC), it might be that no IP address is available for the client device 102. ARP is usually used to find the binding, or to announce the binding of MAC and IP of a client device. However, there are exceptions to this, and valid ARP messages can still be used when the IP address of the client device is unknown.

A typical scenario is when a client device sends an ARP message for the purpose of duplicate address detection, DAD. This ARP message contains a source MAC address of the client device implementing the DAD, but with an IP of 0.0.0.0 to make sure no ARP caches are corrupted. In this case the destination IP address is the node which the client device is checking for DAD.

This approach could also be used so that the switches 103, 105 can be notified of the client device's presence. If the IP address of the client device 102 is not known, the ONT/ONU 114 sends an ARP message containing a pre-configured or hard-coded/random IP address of a node, since the destination and response is of no interest: the switches do not need to know the IP address of the client device 102. What is important is that the switches 103, 105 are notified of the existence of the MAC address of the client device 102 so that the CAM in each switch 103, 105 can be updated.

An example of an ARP message of this type is shown below:

```
Ethernet II, Src: 02:02:02:02:02:02, Dst: ff:ff:ff:ff:ff:ff
    Destination: ff:ff:ff:ff:ff:ff (Broadcast)
    Source: 02:02:02:02:02:02 (02:02:02:02:02:02)
    Type: ARP (0x0806)
    Trailer: 000000000000000000000000000000000000
Address Resolution Protocol (request/gratuitous ARP)
    Hardware type: Ethernet (0x0001)
    Protocol type: IP (0x0800)
    Hardware size: 6
    Protocol size: 4
    Opcode: request (0x0001)
    Sender MAC address: 02:02:02:02:02:02
(02:02:02:02:02:02)
    Sender IP address: 0.0.0.0 (192.168.1.1)
    Target MAC address: ff:ff:ff:ff:ff:ff (Broadcast)
    Target IP address: 192.168.1.1 (192.168.1.1)
```

The Target IP address could be any address, but to avoid any unwanted response that could be interpreted as an address conflict by some devices on the network, it may be beneficial to allow the operator to configure a reserved un-used address that could be used for this specific purpose. All the DAD messages could use this address, and no response would result. Either of these approaches could be used, and the desired result will be the same from a network update perspective.

It will be appreciated that the message sent upstream by the ONT/ONU need not be a gratuitous ARP message. Any valid Layer 2 message which includes the MAC address of the client device 102 as a source address could be sent to force an update at the switches 103, 105. The use of a gratuitous ARP message is simple, but the same result could be achieved by other Layer 2 protocols, because the switches 103, 105 are normally only looking for the source A method as claimed in address in packets The switches 103, 105 in the network will update their learned tables so that traffic flows can be forwarded to the new OLT 107 serving the client device 102. This mechanism is necessary to address a fast switch over on the Ethernet Network interconnecting the OLTs to the Application Server.

When the Gratuitous ARP message has been propagated through the Ethernet Network (L2 Network) the traffic path has been updated, without having to rely on the client device 102 re-sending packets upstream to force re-learning on the MAC tables of the L2 switches 103, 105. This significantly improves the switch-over time, and also increases the reliability of switch-over independently of the protocols used by the client device 102 and application server 101. This is particularly important for uni-directional communication using protocols such as UDP in a downstream direction, since otherwise communication could be broken for a long time before MAC table timeout occurs.

Figure 4:
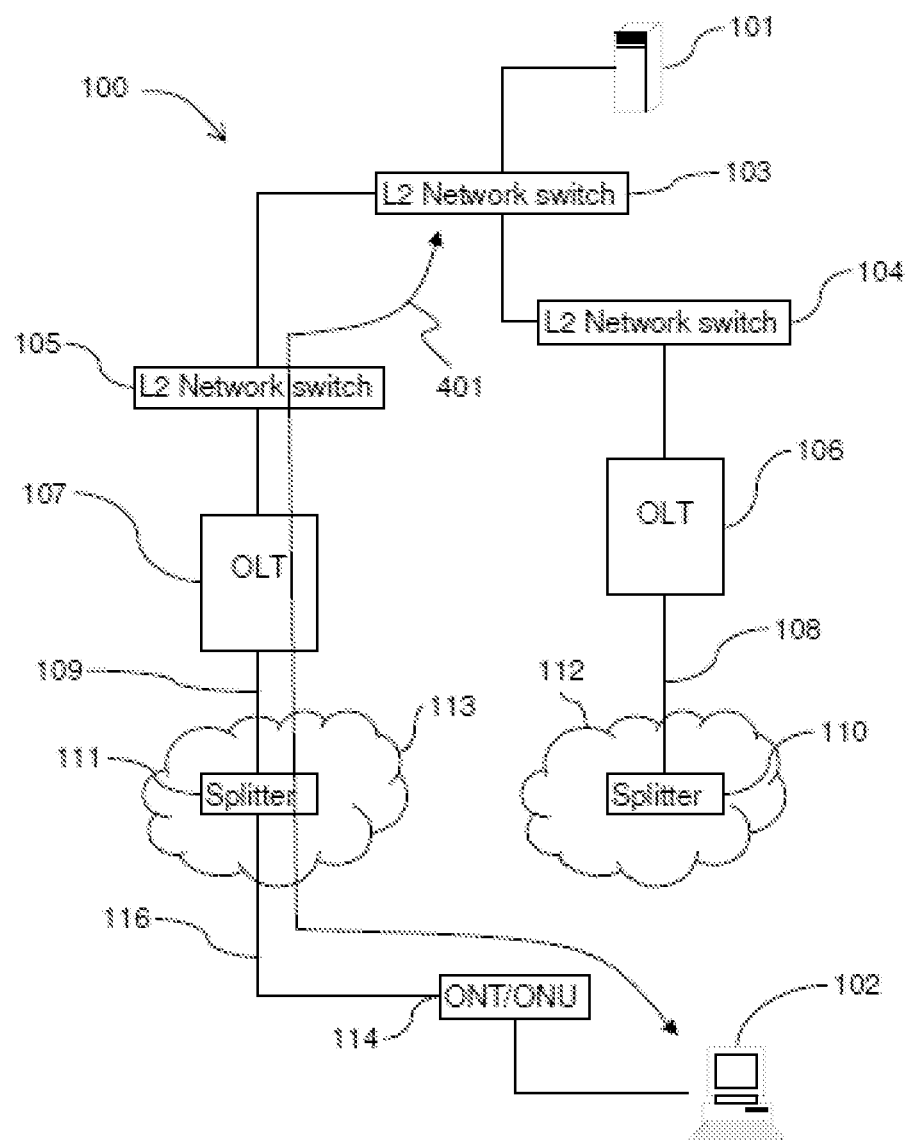
FIG. 4 is a schematic illustration of the network of FIG. 3 showing a secondary data path between the client device and application server.

FIG. 4 is a schematic diagram of the network 100 of FIGS. 1-3, illustrating the traffic flowing 401 after the network has been update by the Gratuitous ARP messages sent by the ONT/ONU 114.

Figure 5:
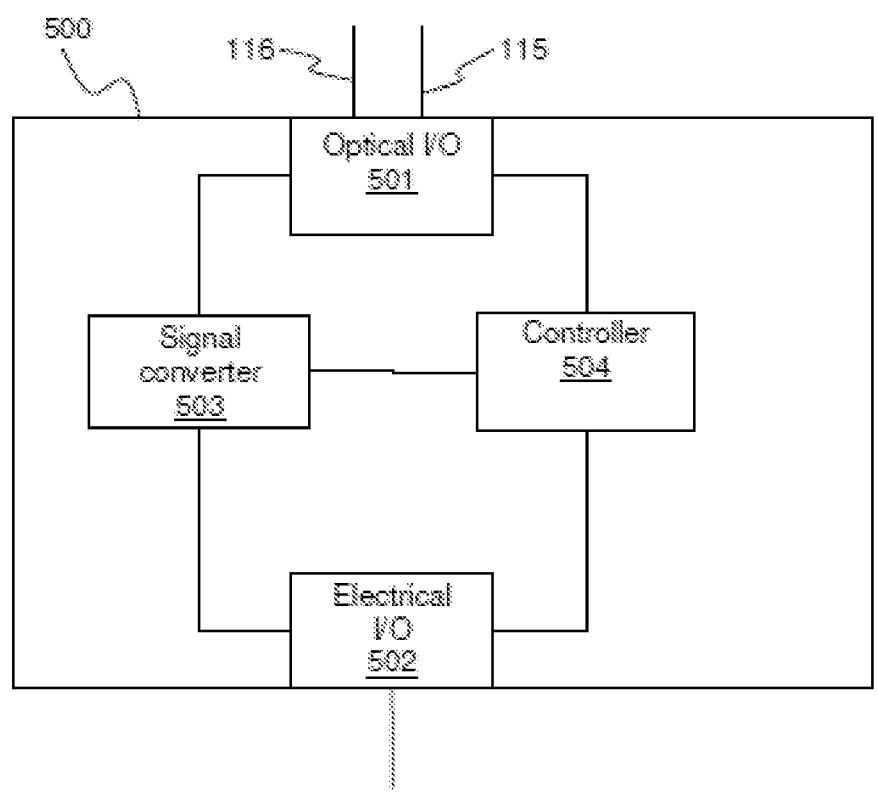
FIG. 5 is a schematic diagram of an optical terminal.

FIG. 5 is a schematic diagram of an optical terminal 500 which could operate as the ONT 114. The terminal 500 includes an optical input/output module connected to optical fibres 115, 116 (or to a single fibre which is split further upstream or downstream) and an electrical input/output module for communicating with the client device 102 and any other client devices connected to the terminal 500, or with ethernet switches. A signal converter 503 is operatively connected to the optical and electrical input/output modules 501, 502 for converting data packets so that an optical signal received by the optical I/O module 501 can be transmitted as an electrical signal from the electrical I/O module 502, and vice versa. A controller 504 is configured to control the operation of the I/O modules and the signal converter 503.

The controller 504 is configured to cause the optical terminal to inspect packets passing through the signal converter so as to be aware of the MAC addresses (and possibly also IP addresses) of client devices 102 downstream of the optical terminal 500. The controller is also configured to detect a failure in the optical network upstream (usually as a result of a broken fibre or failed OLT) and initiate an automatic protection switch to another fibre or ODN. When an automatic protection switch has been initiated, the controller is configured to generate gratuitous ARP messages (or suitable equivalents) to send upstream. As discussed above, such messages should contain at least the MAC address of each client device 102.

It will be appreciated that the controller 504 may comprise a single processor, or may be any arrangement that is suitable for carrying out the actions described. One or more individual processors may be used to implement the controller, and it is also conceivable that the I/O modules and controller may be incorporated together or in any combination in one (or more) circuit.

The functional modules described above can be implemented as program modules of a computer program comprising code means which when run by a processor in the optical terminal 500 causes the optical terminal to perform the above-described functions and actions. The processor may not only be a single CPU (Central processing unit), but could comprise two or more processing units in the optical terminal 500. For example, the processor may include general purpose microprocessors, instruction set processors and/or related chips sets and/or special purpose microprocessors such as ASICs (Application Specific Integrated Circuit). The processor may also comprise board memory for caching purposes. The computer program may be carried by a computer program product in the optical terminal 500 connected to the processor. The computer program product comprises a computer readable medium on which the computer program is stored. For example, the computer program product may be a flash memory, a RAM (Random-access memory) ROM (Read-Only Memory) or an EEPROM (Electrically Erasable Programmable ROM), and the computer program modules described above could in alternative embodiments be distributed on different computer program products in the form of memories within the optical terminal 500.

It will be appreciated that the optical terminal 500 could also be an OLT.

Figure 6:
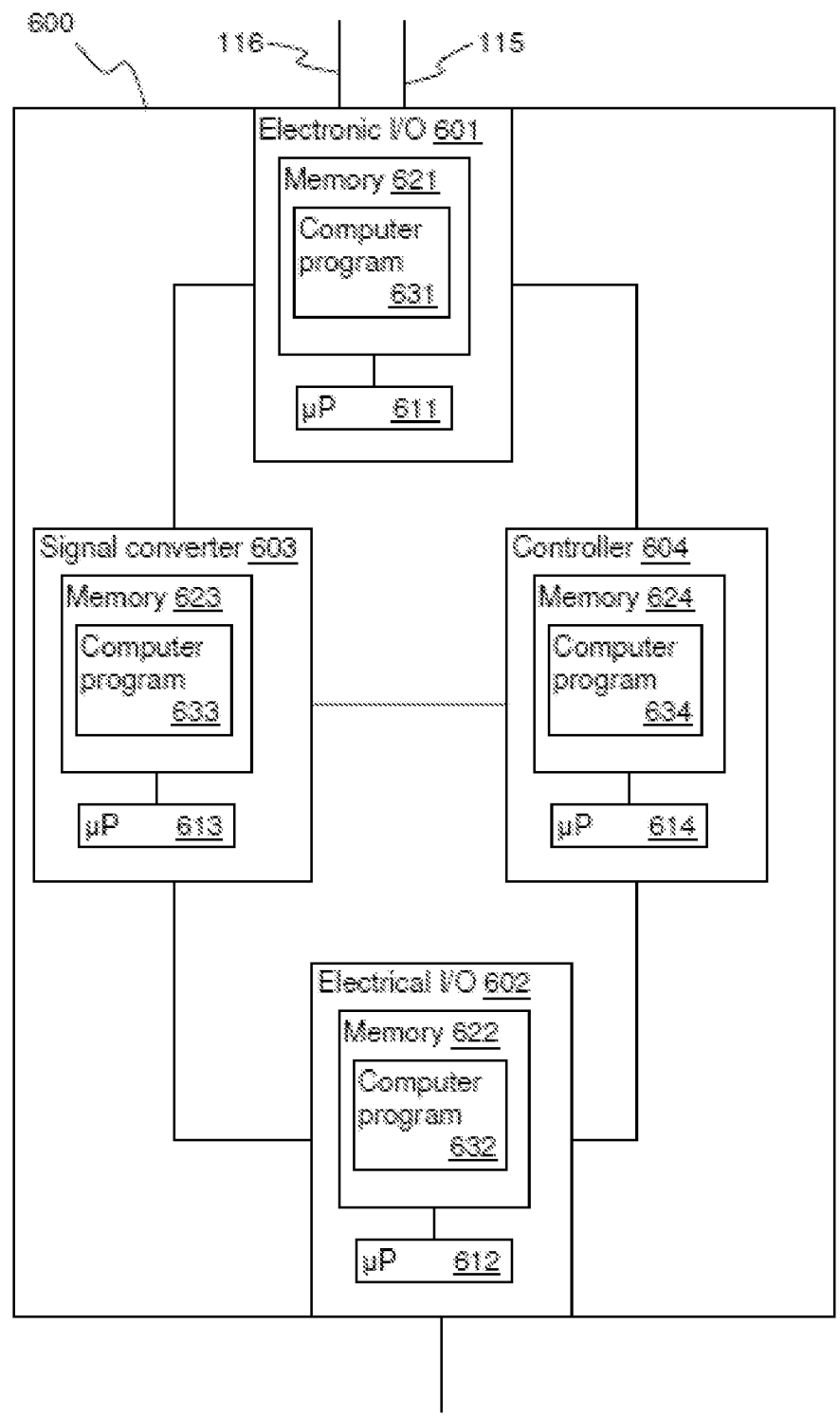
FIG. 6 is a schematic diagram of an alternative optical terminal.

In practice the optical terminal is likely to be operated by software, and FIG. 6 is an illustration of an optical terminal 600, which could be an ONT 114 or an OLT as with the terminal 500 shown in FIG. 5, illustrating how this may be implemented. In this case the optical terminal again includes a optical and electrical I/O modules transceiver 601, 602, signal converter 603 and controller 604. Each module includes a processing unit 611, 612, 613, 614. Each processing unit 611, 612, 613, 614 is associated with a computer program product in the form of a memory 621, 622, 623, 624, e.g. one or more of a ROM, hard disk, flash memory or EEPROM. The memories 621, 622 associated with the I/O modules 601, 622 comprise computer programs 631, 632 which can be run by the processing units 621, 622 to control the transmittal and receipt of data. The memory 624 associated with the controller 604 comprises a computer program 634 which can be run by the processing unit 614, as a result of which the processing unit 614 can detect a failure in the optical network upstream (usually as a result of a broken fibre or failed OLT) and initiate an automatic protection switch to another fibre or ODN. The memory 623 associated with the signal converter 603 contains a computer program 633 which can be run by the processing unit 613 to control the conversion of data between an optical and electrical medium.

It will be appreciated that each processing unit 611, 612, 613, 614 may comprise one or more individual processors. It will further be appreciated that the processing units 611, 612, 613, 614 are shown as separate entities in FIG. 6 to assist understanding, but may be provided as part of a single entity or set of entities providing processing capabilities to the transceiver and/or controller. Similarly, the memories 621, 622, 623, 624 may be discrete memories or memory spaces associated with separate processors or may be part of a larger entity. The computer programs 631, 632, 633, 634 may be separate entities, or may be constituent parts of the same computer program, which may be run by separate processors or the same processor.

Figure 7:
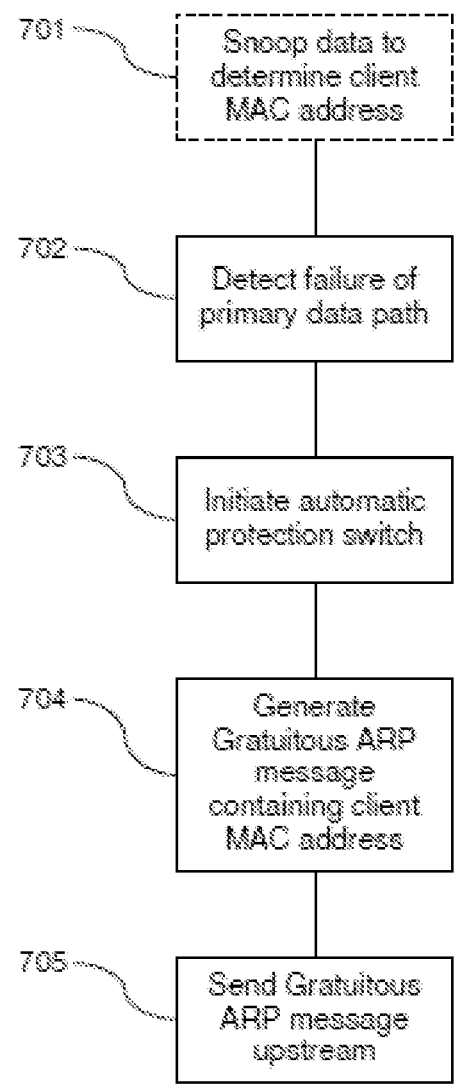
FIG. 7 is a flow diagram illustrating a method for effecting an automatic protection switch.

FIG. 7 is a flow diagram illustrating the steps involved in effecting an automatic protection switch at an optical terminal such as the ONT 114.

701: The optical terminal snoops data packets passing therethrough and thus knows the MAC addresses of clients downstream.

702: The optical terminal becomes aware of a failure of a primary data path.

703: The optical terminal initiates an automatic protection switch.

704: The optical terminal generates Gratuitous ARP messages (or other suitable traffic flow update messages). Each contains the MAC address (and possibly also IP address) of one of the client devices connected to that terminal.

705: The Gratuitous ARP messages are sent upstream (i.e. towards the application server).

It will be appreciated that variations from the examples described above may still fall within the scope of the invention. It will be appreciated that the example shown involves a switch to a secondary path via a second ODN, OLT and splitter. However, it may be that the secondary path still passes through the primary OLT. Other arrangements of back-up or secondary traffic paths can be envisaged.

It will also be appreciated that the address updates need not be initiated by the ONT/ONU, but could be initiated by the OLT. If this is the case, the OLT will need to know the MAC addresses of all the client devices connected thereto, and this can lead to scalability problems, since it is not unusual for a single OLT to be connected to many thousands of ONT/ONUs, each of which may be in turn connected to typically 1-20 client devices. One possible approach might be to use several cards in each OLT, each responsible for a reduced number of client devices, to assist with scalability.

It will be appreciated that the approach described above uses a standard protocol which allows for interoperability with multiple network equipment vendors. It provides a simple but effective mechanism to handle automatic protection switching across multiple OLTs. It enables a fast mechanism for restoring traffic flows/paths after automatic protection switching. It does not require any intercommunication between the OLTs and other nodes to update the Ethernet network. It does not rely on the client device to implement specific functions to allow fast automatic protection switch over. Thus the invention, at least in preferred embodiments, provides a solution that can use standard protocols and additional intelligence in the ONT/ONU to solve the update of the traffic flows in the Ethernet network.

The invention claimed is:

1. An optical terminal for use in a passive optical network, comprising:
   an optical I/O module for sending and receiving optical data packets along an optical fibre;
   an electrical I/O module for sending and receiving electrical data packets via an electrical connection;
   a signal converter operatively connected to the optical and electrical I/O modules for converting the data packets between optical and electrical formats; and
   a controller for controlling the operation of the I/O modules and the signal converter, the controller being configured to:
      detect a failure of a primary data path in the optical network;
      initiate an automatic protection switch to a secondary data path for optical data packets; and
      in response to the automatic protection switch to the secondary data path, generate traffic flow update messages to be sent upstream, each traffic flow update message containing, as a source address, a MAC address of a client device downstream of the terminal,
      wherein the primary data path in the optical network optically couples the optical terminal to a first other optical terminal, and wherein the secondary data path for optical data packets optically couples the optical terminal to a second other optical terminal that is not the first other optical terminal.

2. The optical terminal of claim 1, wherein the controller is configured to inspect data packets processed by the signal converter and identify, from the inspected data packets, MAC addresses of client devices downstream of the terminal.

3. The optical terminal of claim 2, further configured to store the MAC addresses of the client devices downstream of the terminal.

4. The optical terminal of claim 1, wherein each traffic control flow update message further contains an IP address of the client device downstream of the terminal.

5. The optical terminal of claim 1, configured to co-operate with an Ethernet network upstream of the passive optical network.

6. The optical terminal of claim 1, wherein the traffic flow update messages are Gratuitous ARP messages.

7. The optical terminal of claim 1, wherein the traffic flow update messages are NDP messages.

8. The optical terminal of claim 1, wherein the optical terminal is an Optical Network Terminal and the first and second other optical terminals are respective first and second Optical Line Terminals.

9. The optical terminal of claim 1, wherein the optical terminal is an Optical Line Terminal and the first and second other optical terminals are respective first and second Optical Network Terminals.

10. A network for delivering data from an application server to a client device, comprising:
    an Ethernet network for receiving data packets from the application server;
    a passive optical network comprising a primary data path and a secondary data path for receiving the data packets from the Ethernet network; and
    a service network for receiving the data packets from the passive optical network and delivering them to the client device;
    wherein the passive optical network includes the optical terminal of claim 1.

11. A method of effecting an automatic protection switch in a passive optical network, comprising:
    at an optical terminal, detecting a failure of a primary data path for optical data packets in the network;
    at the optical terminal, initiating the automatic protection switch to a secondary data path for the optical data packets;
    at the optical terminal, in response to the automatic protection switch to the secondary data path, generating traffic flow update messages and inserting into each traffic flow update message, as a source address, a MAC address of a client device downstream of the optical terminal; and
    sending the traffic flow update messages upstream from the optical terminal,
    wherein the primary data path in the optical network optically couples the optical terminal to a first other optical terminal, and wherein the secondary data path for the optical data packets optically couples the optical terminal to a second other optical terminal that is not the first other optical terminal.

12. The method of claim 11, further comprising carrying out snooping at the optical terminal to identify and store MAC addresses of client devices downstream of the optical terminal.

13. The method of claim 11, wherein each traffic control flow update message further contains an IP address of the client device downstream of the terminal.

14. The method of claim 11, wherein the passive optical network is configured to transmit data from an Ethernet network, and wherein the traffic flow update messages are sent upstream into the Ethernet network for use by switches in the Ethernet network.

15. The method of claim 11, wherein the traffic flow update messages are Gratuitous ARP messages.

16. The method of claim 11, wherein the traffic flow update messages are NDP messages.

17. The method of claim 11, wherein the optical terminal is an Optical Network Terminal and the first and second other optical terminals are respective first and second Optical Line Terminals.

18. A nontransitory computer readable storage medium having stored therein a computer program that, when executed by a programmable processor, causes the programmable processor to perform a method of effecting an automatic protection switch in a passive optical network, the method comprising:

at an optical terminal, detecting a failure of a primary data path for optical data packets in the network;

at the optical terminal, initiating the automatic protection switch to a secondary data path for the optical data packets;

at the optical terminal, in response to the automatic protection switch to the secondary data path, generating traffic flow update messages and inserting into each traffic flow update message, as a source address, a MAC address of a client device downstream of the optical terminal; and sending the traffic flow update messages upstream from the optical terminal, wherein the primary data path in the optical network optically couples the optical terminal to a first other optical terminal, and wherein the secondary data path for the optical data packets optically couples the optical terminal to a second other optical terminal that is not the first other optical terminal.

\* \* \* \* \*